Sept. 26, 1933.     A. BARÉNYI     1,927,884
PHOTOGRAPHIC CAMERA
Filed May 27, 1932      3 Sheets-Sheet 2
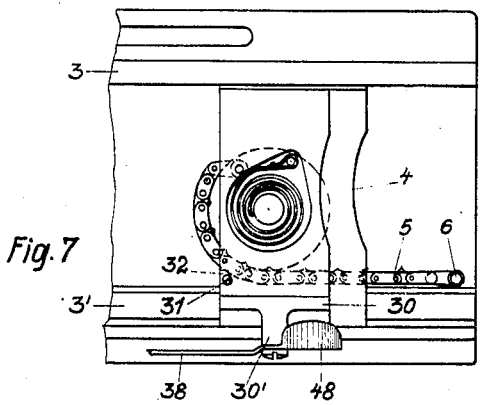
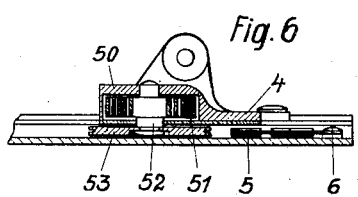
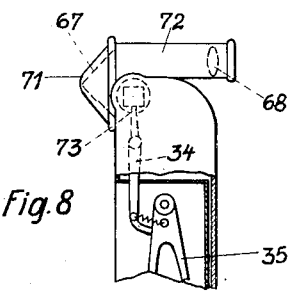
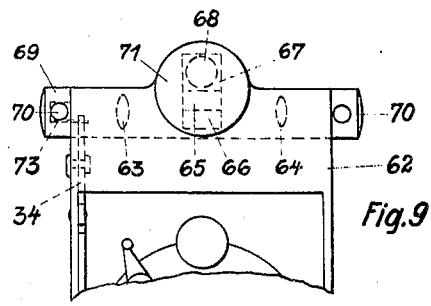
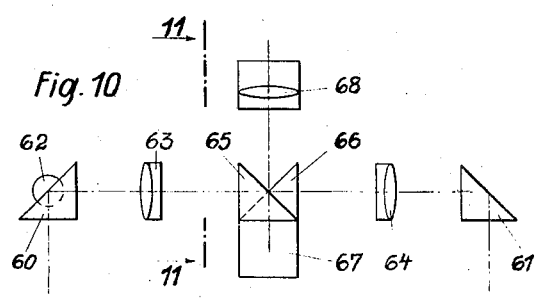
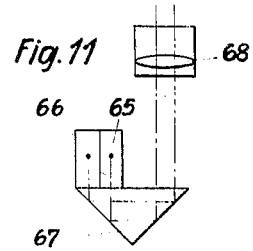
Inventor
Árpád Barényi
by
Frank Reinhard.
Attorney Sept. 26, 1933.  A. BARÉNYI  1,927,884
PHOTOGRAPHIC CAMERA
Filed May 27, 1932   3 Sheets-Sheet 3

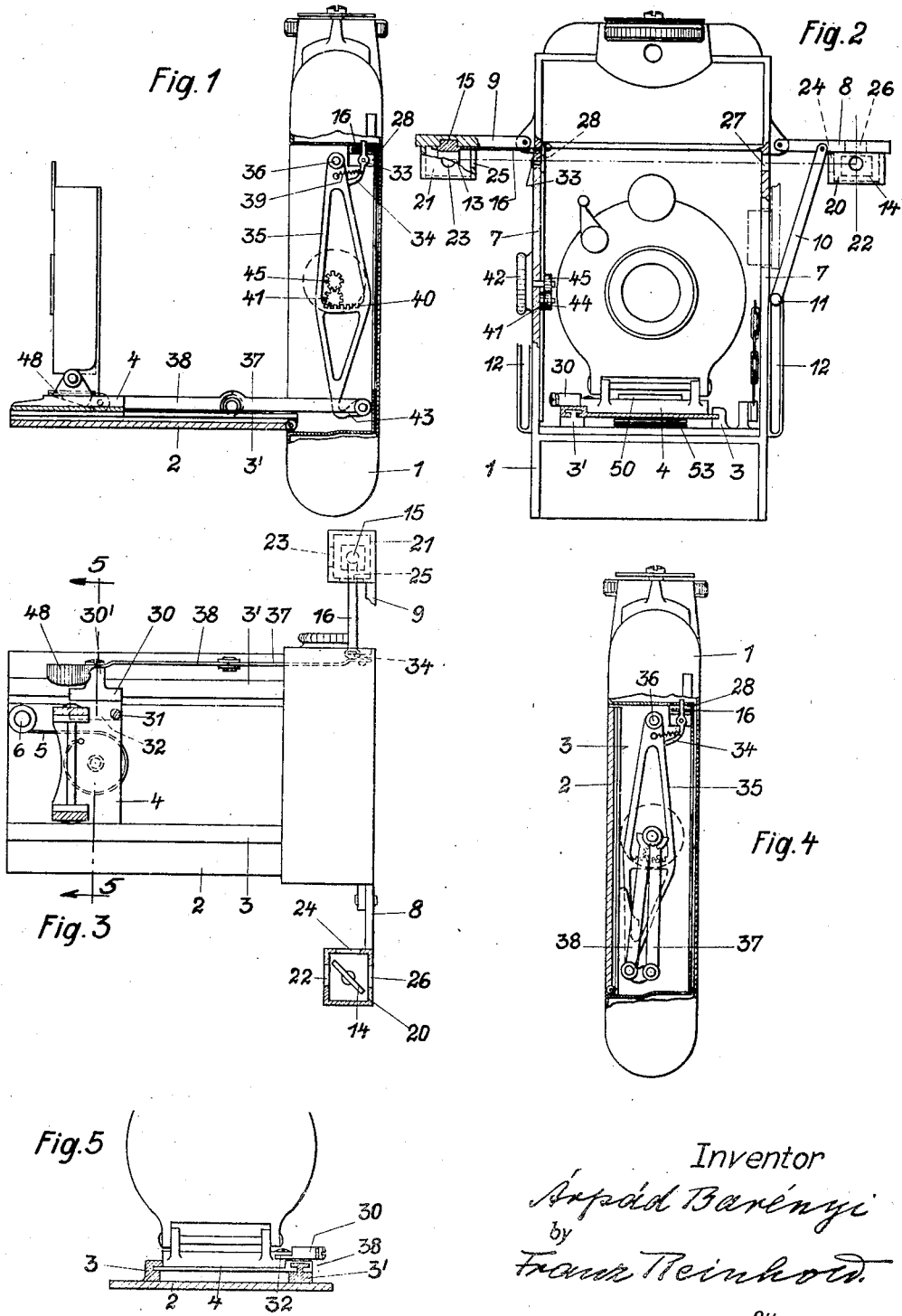

Inventor
Arpád Barényi
by
Franz Reinhard
Attorney

Patented Sept. 26, 1933

1,927,884

UNITED STATES PATENT OFFICE 1,927,884

PHOTOGRAPHIC CAMERA

Árpád Barényi, Berlin-Lichterfelde, Germany, assignor to Voigtländer & Sohn Aktiengesellschaft, of Brunswick, Brunswick, Germany, a joint-stock company of Germany Application May 27, 1932, Serial No. 613,895, and in Germany May 30, 1931

25 Claims. (Cl. 95—44)

My invention relates to improvements in photographic cameras, and more particularly in cameras of the type comprising a distance finder connected with the lens front for setting the object glass at the distance away from the sensitized plate, which corresponds to the distance of the object from the camera. One of the objects of the improvements is to provide a camera of this type in which the distance finder and the mechanism controlling the position of the lens front may be operated, whether the folding baseboard on which the lens front is shiftable be in projected or in collapsed position. With this object in view my invention consists in connecting the said mechanism with the lens front by parts which are adapted to be folded into the casing when the baseboard is collapsed and to be expanded when the lens front is projected. Another object of the improvements is to provide a combined camera and distance finder operating on the principle of the parallax and by means of which the distance of the object may be accurately ascertained, and with this object in view my invention consists in disposing the distance finder or a part thereof on an arm or arms which are adapted to be projected from the camera, so that the base from which the distance is measured is enlarged beyond the breadth of the camera.

For the purpose of explaining the invention several examples embodying the same have been shown in the accompanying drawings, in which the same letters of reference have been used in all the views to indicate corresponding parts.

Figure 12:
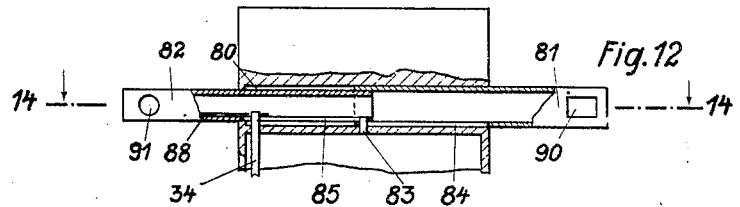
Figure 13:
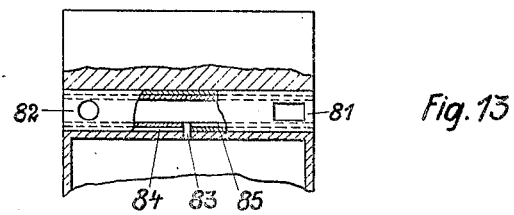
Figure 14:
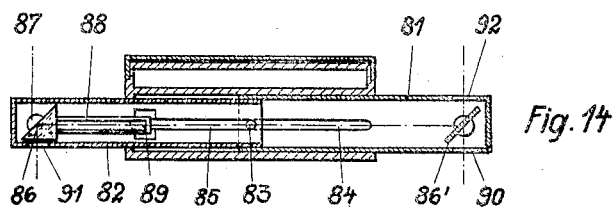
Figure 15:
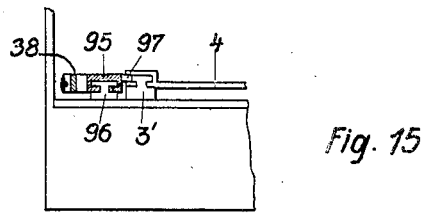
Figure 16:
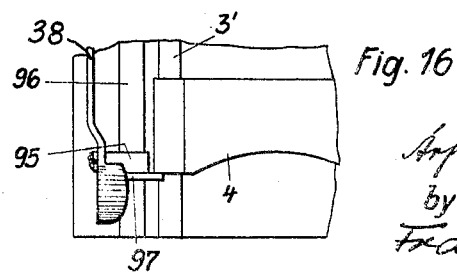

In said drawings,

Fig. 1 is a sectional elevation showing a roll-film camera, the baseboard and lens front being in projected position, Fig. 2 is an elevation partly in section viewed from the left in Fig. 1, Fig. 3 is a plan view, Fig. 4 is a sectional elevation of the camera showing the baseboard collapsed, Fig. 5 is a sectional elevation of the baseboard taken on the line 5—5 of Fig. 3, Fig. 6 is a sectional elevation of the front part of the baseboard and the lens front, Fig. 7 is a plan view of Fig. 6, Fig. 8 is an elevation of the top part of the camera partly in section showing a modification of the distance finder, Fig. 9 is an elevation viewed from the left in Fig. 8, Fig. 10 is a diagrammatical plan view showing the optical system of the distance finder shown in Figs. 8 and 9, Fig. 11 is an elevation viewed from the side of Fig. 10, Fig. 12 is an elevation of the top part of a camera partly in section illustrating another modification of the distance finder, Fig. 13 is a similar elevation showing the parts of the distance finder collapsed, Fig. 14 is a sectional plan view taken on the line 14—14 of Fig. 12, Fig. 15 is a sectional elevation showing the front part of the baseboard and illustrating another modification of the mechanism connected with the distance finder, and Fig. 16 is a plan view of Fig. 15.

In Figs. 1 to 5 I have shown my invention as embodied in a roll-film camera. But I wish it to be understood that my invention is not limited to the use in a camera of this type.

As shown in the said figures the camera comprises a casing 1 having a baseboard 2 hinged thereto. On guide rails 3, 3' secured to the baseboard a lens front 4 is mounted which is acted upon by a spring 51 (cf. Figs. 6 and 7) and a chain 5 attached to a pin 6 rising from the baseboard and to the lens front 4 and tending to project the lens front outwardly, to the left, Figs. 1 and 3; to the right, Figs. 6 and 7.

On lateral eyes 17 provided on the upper parts of the side walls 7 of the casing arms 8 and 9 are rockingly mounted which are connected by links 10 with pins 11 sliding in slotted guide members 12 secured to the side walls 7. The arms 8 and 9 provide a support or part of the support of a distance finder. The distance finder operates on the principle of the parallax. As shown in the figures the said distance finder comprises a prism or mirror 13 and a mirror 14. The mirror or prism 13 is rockingly mounted on the arm 9 by means of a pivot bolt 15 connected with a lever 16 disposed longitudinally of the arm 9 and extending into the casing 1 through a slot 28 made in the left hand side wall 7. The mirror 13 is disposed substantially at an angle of 45° to the optical axis of the lens of the camera, and it is adapted to be set at different angles by means of the lever 16. The mirror 14 is fixed to the arm 8, and it is disposed at an angle of 45° to the optical axis of the object glass. The mirrors 14 and 13 are disposed in casings 20 and 21 carried by the arms 8 and 9, and the front and inner sides of the said casings 20 and 21 are formed with openings 22, 23, 24 and 25 permitting the passage of rays to and from the mirrors. In addition, the rear wall of the casing 20 is formed with an opening 26. The side walls 7, 7 are provided with slots 27 and 28, and the openings 24, 25 and slots 27, 28 are in alignment. The mirror 13 is adapted to reflect light rays impinging thereon from the object through 25, 28, 27 and 24 and on the mirror 14, and the said mirror 14 reflects the rays rearwardly and through the opening 26 into the eye of the photographer. The reflecting coating of the mirror 14 is made semi-transparent, and therefore light rays coming from the object and passing through the opening 22 pass through the said mirror without being reflected, and they pass through the opening 26 together with the rays coming from the mirror 13.

When the arms 8 and 9 are rocked downwardly the casings 20 and 21 may be received in openings made in the side walls 7, as is shown in Fig. 2 in broken lines.

The distance finder is used by first projecting the arms 8 and 9, whereupon the attendant looks through the opening 26 and towards the object to be photographed, whereupon he turns the mirror 13 until corresponding rays coming from the object and passing through the openings 23 and 22 are made to coincide, and all the contours of the object viewed through the opening 26 coincide. Now the angular position of the mirror 13 and therefore the position of the arm 16 indicate the distance of the object.

The distance finder is used for determining the position of the lens front, so that the object glass is set at the proper distance away from the sensitized surface, and for this purpose mechanism is provided intermediate the distance finder and the lens support which may be set in position, whether the baseboard 2 and the lens front be in projected or in collapsed position.

To the left hand side of the lens front 4 (Fig. 2) a block 30 is secured by means of a screw 31 (cf. Fig. 3). Preferably the said block engages the lens front in a groove 32 in which it may, before being secured, be adjusted in a direction longitudinally of the baseboard 2.

On a pivot bolt 33 secured to the left hand side wall 7 of the casing a lever 34 is rockingly mounted which engages in a slot made in the inner end of the lever 16. The lower end of the lever 34 is held, by a spring 39, in loose engagement with a one-armed lever 35 near the fulcrum 36 thereof, and at its lower end the said lever is connected by two jointed links 37 and 38 with a pivot bolt carried by the boss 30' of the block 30. The links 37, 38 constitute an expansible and collapsible spacing element between lever 35 and block 30. By virtue of such spacing element the lever is constituted means which limit the range of outward movement of the lens front. The lever 35 is formed with a toothed segment 40 which is engaged by a pinion 41. On the axle of the said pinion a pinion 44 is mounted which is in mesh with a pinion 45 secured to the axle of a milled disk 42, the said disk being located on the outside of the casing, as is shown in Fig. 2. Preferably the lower end of the lever 35 is formed with a laterally directed arm 43 of comparatively thin material, which may be readily bent for adjusting the lever 35 relatively to the links 37, 38. To the outer end of the link 38 a thumb piece 48 is secured which may be pressed downwardly for collapsing the links 37, 38.

The distance finder may be used for setting the mechanism 33, 34, 35, 37, 38 in position while the baseboard 2 and the lens front are collapsed and in the position shown in Fig. 4. For this purpose the photographer turns the milled disk 42, which movement is transmitted through the levers 35, 34, 16 to the mirror 13, until both images of the object coincide. By the said operation of the disk 42 the lower end 43 of the lever 35 is shifted inwardly or outwardly, and such displacement of the lever is possible because the links 37 and 38 are in the folded position shown in Fig. 4. After the mechanism has thus been set the baseboard 2 may be projected forwardly, and the spring 5 will then draw the lens front outwardly until the links 37 and 38 are expanded and come to the fully extended position of alignment, as is shown in Fig. 1. Now the lens front is in the position which corresponds to the adjustment of the lever 35 and the distance of the object. In a similar way the lens front may be adjusted after the baseboard 2 and the lens front have been projected.

If it is desired to collapse the camera the attendant depresses the thumb piece 48, whereupon the lens front may be pushed inwardly against the tension of the spring 5, and the baseboard may then be rocked upwardly and into position for closing the camera.

It will be understood that the lengths of the levers and links are such that after setting the mechanism in the manner described the lens front is in the proper position in which a sharp image is produced on the sensitized film. By providing several gear wheels 41, 44, 45 intermediate the disk 42 and the lever 35 the setting mechanism is self-locking, so that it does not change its adjusted position even if a heavy blow is exerted on the lever 35 by the lens front being projected forwardly by the spring 5.

For compensating for irregularities in the focal length of the object glass means are provided for adjusting the mechanism. In the construction shown in the figures such adjustment may be effected by shifting the block 30 upon the lens front in a direction longitudinally of the baseboard. For this purpose the screw 31 is first loosened and the lens front is brought into correct position by means of a focusing screen, whereupon the block 30 is again fixed to the lens front 4 by means of the screws 31. By such adjustment the position of the folded links 37 and 38 within the closed camera may be changed so far that it is not possible any more to shift the object glass into the camera or to close the baseboard. Therefore the links are additionally set in position by bending the bottom end 43 of the lever 35.

The guide rail 3' is embraced by the grooved portion of the lens front from both sides, so that it prevents lateral displacement of the lens front, while the guide rail 3 guides the lens front only vertically, while it permits lateral play. The link 38 engages the lens front near the rail 3', and thus binding of the lens front is prevented.

In Figs. 6 and 7 I have shown the construction of the spring mechanism provided for projecting the lens front. As shown in the said figures the lens front is provided with a housing 50 in which a spiral spring 51 is located, the said spring being attached at its outer end to the housing and at its inner end to an arbor 52. To the bottom end of the said arbor a sprocket wheel 53 is secured on which the chain 5 is trained. The spring tends to wind the chain 5 on the sprocket wheel 53 and thereby to pull the lens front 4 outwardly.

I wish it to be understood that any suitable distance finder may be used which is adapted to control mechanism acting on the lens front. In Figs. 8 to 11 I have shown a distance finder which cooperates with the mechanism described with reference to Figs. 1 to 5. As appears more particularly from Figs. 10 and 11 the said distance finder comprises two prisms 60 and 61 located one at each side of the camera casing 62. The prism 61 is fixed to its support, and it has its reflecting surface disposed at an angle of 45° to the optical axis of the camera, while the prism 60 is adapted to be rocked about the axis of its pivot bolt 62. Internally of the prisms there are lenses 63 and 64 which direct the rays through prisms 65 and 66 located one above the other, as is shown in Fig. 11. The reflecting faces of the said prisms are disposed so that the rays are reflected forwardly and into a prism 67 provided for reflecting the rays rearwardly in the manner shown in Fig. 11 and into an ocular 68. By the system comprising the prism 60 and 61 and the associated lenses 63 and 64 and prisms 65 and 66 sectional images are thrown into the prism 67 and the ocular 68, and in operation the prism 60 is turned about its pivot bolt until the sectional images reflected by the prisms 66, 61 are combined into a complete image. By observing a vertical line in the object, such as a tree, the prism 60 may be exactly adjusted until the sections of the line are in alignment, and thus exact measurement of the distance of the object is insured.

Figs. 8 and 9 show the manner of mounting the optical system on the camera. The upper end of the camera casing is provided with a tube 69 provided at its front side with openings 70 and having the prisms 60, 61, the lenses 63, 64 and the prism 65, 66 mounted therein. At the front side the camera is formed with a housing 71 in which the prism 67 is mounted, and from the said housing a tube 72 projects rearwardly in which the ocular lens 68 is mounted.

The prism 60 is adapted to be rocked about the axis of its pivot bolt 62 by means of a lever 73, and the said lever engages the lever 34 which is connected through the lever 35 and associated parts with the lens front.

In Figs. 12 to 14 I have shown another modification of the distance finder in which the optical system is similar to the one described with reference to Figs. 1 to 5. However, in lieu of the rockable arms 8 and 9 telescoping tubes 81, 82 are provided which are shiftably mounted in a guide way provided in the camera. As is shown in the said figures the camera casing is provided near its upper end with a transverse passage 80 in which the telescoping tubular rails 81 and 82 are shiftable. Preferably the length of each tube is equal to the breadth of the camera, so that both rails disappear within the passage 80 when they are pushed inwardly, as is shown in Fig. 13. For limiting the outward movement of the tubes a pin 83 is secured to the wall of the passage 80, which is passed through slots 84 and 85 made in the tubes. At its outer end the tube 82 carries the rockingly mounted prism or mirror 86, which is adapted to be turned about its vertical axis 87 by means of a lever 88, the said lever being formed with a slot 89 engaging the lever 34. The mechanism connecting the lever 34 with the lens front 4 is similar to the one illustrated in Figs. 1 to 5. The tube 81 carries a fixed mirror 86', the reflecting coating of which is semi-transparent. The tubes 81 and 82 are formed with openings 90, 91 and 92.

In Figs. 15 and 16 I have shown a modification which may be used in connection with cameras in which the lens front is projected by hand. As shown in the said figures the links 37, 38 are connected with a block 95 slidable on a guide way 96 disposed alongside the guide way 3' of the lens front, and the said block is provided with a laterally directed finger 97 projecting in front of the lens front 4. In the operation of the apparatus the mechanism controlling the block 95 is set in position in the manner described above, whether the baseboard be in collapsed or in projected position, and after projecting the baseboard the lens front 4 is pulled outwardly by hand until it is arrested by the previously set finger 97 of the block 95.

While in describing the invention reference has been made to particular examples embodying the same I wish it to be understood that my invention is not limited to the constructions shown in the accompanying drawings, and that various changes may be made in the general arrangement of the apparatus and the construction of its parts without departing from the invention.

I claim:

1. A photographic camera, comprising a casing, a baseboard adapted to be projected from and collapsed on said casing, a lens front shiftable on said baseboard, a distance finder mounted on said casing, and mechanism associated with said distance finder and adapted to be operated therewith when said baseboard is in collapsed position for determining the position of the object glass relatively to the sensitized surface.

2. A photographic camera, comprising a casing, a baseboard adapted to be projected from and collapsed on said casing, a lens front shiftable on said baseboard, a distance finder mounted on said casing, and mechanism connected with said distance finder and lens front and adapted to be operated with said distance finder when said baseboard is in collapsed position for determining the position of the object glass relatively to the sensitized surface.

3. A photographic camera, comprising a casing, a baseboard hinged to said casing and adapted to be projected from and collapsed on said casing, a lens front shiftable on said baseboard, a distance finder mounted on said casing, and mechanism associated with said distance finder and lens front for determining the position of the object glass relatively to the sensitized surface, said mechanism comprising a portion controlled by said finder and located within said casing and a collapsible part extending from said portion to said lens front.

4. A photographic camera, comprising a casing, a baseboard hinged to said casing and adapted to be projected from and collapsed on said casing, a lens front shiftable on said baseboard, a distance finder mounted on said casing, and mechanism associated with said distance finder and lens front for determining the position of the object glass relatively to the sensitized surface, said mechanism comprising a portion controlled by said finder and located within said casing and jointed collapsible links connected respectively to said portion and lens front.

5. A photographic camera, comprising a casing, a baseboard hinged to said casing and adapted to be projected from and collapsed on said casing, a lens front shiftable on said baseboard, a distance finder mounted on said casing, and mechanism associated with said distance finder and lens front for determining the position of the object glass relatively to the sensitized surface, said mechanism comprising a portion controlled by said finder and located within said casing and ending near the hinge of said baseboard and a collapsible part extending from the end of said portion to said lens front.

6. A photographic camera, comprising a casing, a baseboard adapted to be projected from and collapsed on said casing, a lens front shiftable on said baseboard, a distance finder mounted on said casing, mechanism connected with said distance finder and adapted to be operated therewith whether said baseboard be in projected or in collapsed position for determining the position of the object glass relatively to the sensitized surface, and hand operated means acting on said mechanism for setting the same and said finder in position.

7. A photographic camera, comprising a casing, a baseboard adapted to be projected from and collapsed on said casing, a lens front shiftable on said baseboard, a distance finder mounted on said casing, and mechanism connected with said distance finder and adapted to be operated therewith when said baseboard is in collapsed position for determining the position of the object glass relatively to the sensitized surface, said mechanism comprising a lever mounted on said casing and rockable in a plane parallel to the optical axis of said object glass and connected with said distance finder and a collapsible part connected with said lever and lens front.

8. A photographic camera, comprising a casing, a baseboard adapted to be projected from and collapsed on said casing, a lens front shiftable on said baseboard, a distance finder mounted on said casing, and mechanism jointed to said lens front and associated with said distance finder and adapted to be operated therewith when said baseboard is in collapsed position for determining the position of the object glass relatively to the sensitized surface.

9. A photographic camera, comprising a casing, a baseboard adapted to be projected from and collapsed on said casing, a lens front shiftable on said baseboard, a distance finder mounted on said casing, and mechanism associated with said distance finder and adapted to be operated therewith when said baseboard is in collapsed position for determining the position of the object glass relatively to the sensitized surface, said mechanism comprising a stop member movable independently of said lens front and adapted to limit the outward movement thereof.

10. A photographic camera, comprising a casing, a baseboard adapted to be projected from and collapsed on said casing, a lens front shiftable on said baseboard, a distance finder mounted on said casing, mechanism associated with said distance finder and adapted to be operated therewith when said baseboard is in collapsed position for determining the position of the object glass relatively to the sensitized surface, and means for adjusting said mechanism for setting the lens front the proper distance away from the sensitized film.

11. A photographic camera, comprising a casing, a baseboard adapted to be projected from and collapsed on said casing, a lens front shiftable on said baseboard, a distance finder mounted on said casing, mechanism associated with said distance finder and adapted to be operated therewith when said baseboard is in collapsed position for determining the position of the object glass relatively to the sensitized surface, and means for adjustably connecting said mechanism with said lens front.

12. A photographic camera, comprising a casing, a baseboard adapted to be projected from and collapsed on said casing, a lens front shiftable on said baseboard, a distance finder mounted on said casing, and mechanism associated with said distance finder and adapted to be operated therewith when said baseboard is in collapsed position for determining the position of the object glass relatively to the sensitized surface, said mechanism comprising a lever rockingly mounted on said casing and formed at its lower end with a bendable portion, and a collapsible portion connected with said bendable lower end of said lever and having an adjustable outer end acting on said lens front.

13. A photographic camera, comprising a casing, a baseboard adapted to be projected from and collapsed on said casing, a lens front shiftable on said baseboard, a guide rail on said baseboard on which said lens front is guided and constructed for preventing transverse movement, a second guide for said lens front permitting transverse movement, a distance finder mounted on said casing, and mechanism associated with said distance finder for determining the position of the object glass relatively to the sensitized surface, said mechanism acting on said lens front near the guide thereof preventing transverse movement.

14. A photographic camera, comprising a casing, a baseboard adapted to be projected from and collapsed on said casing, a lens front shiftable on said baseboard, a distance finder mounted on said casing, mechanism associated with said distance finder for determining the position of the object glass relatively to the sensitized surface, and self-locking hand-operated means acting on said mechanism for setting the same and the distance finder in position.

15. A photographic camera, comprising a casing, a baseboard adapted to be projected from and collapsed on said casing, a lens front shiftable on said baseboard, a distance finder mounted on said casing, and mechanism associated with said distance finder and adapted to be projected therewith when said baseboard is in collapsed position for determining the position of the object glass relatively to the sensitized surface, said mechanism comprising a lever rockingly mounted on said casing and formed with a rack, a series of gear wheels for driving said rack, and a disk for rotating said gear wheels.

16. A photographic camera, comprising a casing, an arm adapted to be projected laterally from said casing, and a distance finder mounted on said casing and arm.

17. A photographic camera, comprising a casing, two arms hinged to opposite sides of said casing and adapted to be projected therefrom and to be collapsed, and a distance finder mounted on said arms.

18. A photographic camera, comprising a casing, a lens front mounted on said casing and adapted to be projected therefrom, an arm adapted to be projected laterally from said casing, a distance finder mounted on said arm and casing, and mechanism intermediate said distance finder and lens front controlling the position of the lens front relatively to the sensitized surface.

19. A photographic camera, comprising a casing, two arms hinged to opposite sides of said casing and adapted to be projected therefrom and to be collapsed, and a distance finder mounted on said arms and having a path of rays from one arm to the other, said camera being formed with a passage permitting the rays to pass therethrough.

20. A photographic camera, comprising a casing, a baseboard, a lens front movable on said baseboard, a sprocket wheel mounted on said lens front, a chain trained on said sprocket wheel and attached with its free end to said baseboard, and a spring acting on said sprocket wheel and tending to wind the chain thereon.

21. In a photographic camera the combination of a casing, a spring-impelled lens front movable on the casing, a distance finder including a spring-impelled movable element, a hand-controlled lever pivotally mounted in said casing and adapted in its pivotal movement to shift simultaneously against spring tension both the lens front and the movable element of the distance finder.

22. In a photographic camera the combination of a casing, a lens front movable inwardly and outwardly on the casing, a focusing device operating on the principle of the parallax and including a mirror rotatably mounted on the casing, a hand-controlled lever pivotally mounted on the casing, and a spring tending to rotate the mirror in one direction, the said lever constituting means limiting both the spring-impelled movement of the mirror and the outward movement of the lens front, and the said lever adapted in its range of pivotal movement to rotate the mirror against the tension of its impelling spring.

23. In a photographic camera the combination of a casing, a lens front movable upon the casing, a focusing device operating on the principle of the parallax and including a mirror rotatably borne by the casing, a hand-controlled lever pivotally mounted in the casing, a spring tending to rotate the mirror in one direction, and a spring tending to shift the lens front in one direction, the said lever constituting means limiting both the spring-impelled rotation of the mirror and the range of outward movement of the lens front and adapted both to rotate the mirror and to shift the lens front against the tensions of their impelling springs.

24. In a photographic camera the combination of a casing, a lens front movable on the casing, a focusing device operating on the principle of the parallax and including a mirror rotatably mounted on the casing, a hand-controlled lens pivotally mounted in the casing, a block adjustably secured to the lens front, an expansible and collapsible spacing element making connection between said lever and said block, and a spring tending to rotate the said mirror in one direction, the said lever constituting a stop, limiting the movement of the mirror in response to spring tension.

25. In a photographic camera the combination of a casing, a lens front movable inwardly and outwardly on the casing, a focusing device operating on the principle of the parallax and including a mirror rotatably mounted on the casing, a hand-controlled lever pivotally mounted in the casing, a block adjustably secured to the lens front, an expansible and collapsible spacing element making connection between said lever and said block, a spring tending to rotate said mirror in one direction, and a spring tending to move the lens front outwardly, the said lever constituting a stop, limiting the movement of the mirror in response to spring tension.

ÁRPÁD BARÉNYI.